E. B. MORRIS.
GEAR CONTROL FOR AUTOMOBILES.
APPLICATION FILED OCT. 15, 1921.

1,433,023.

Patented Oct. 24, 1922.
2 SHEETS—SHEET 1.

INVENTOR
E. B. MORRIS

ATT.'YS

E. B. MORRIS.
GEAR CONTROL FOR AUTOMOBILES.
APPLICATION FILED OCT. 15, 1921.
1,433,023.
Patented Oct. 24, 1922.
2 SHEETS—SHEET 2.
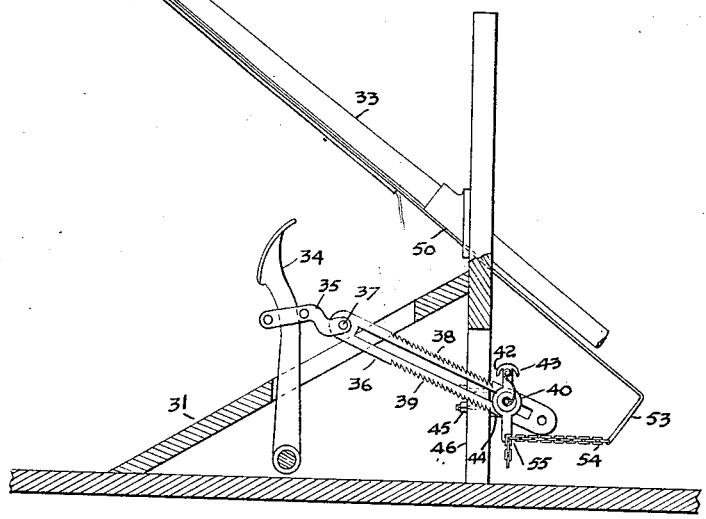
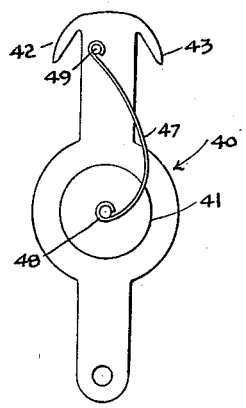
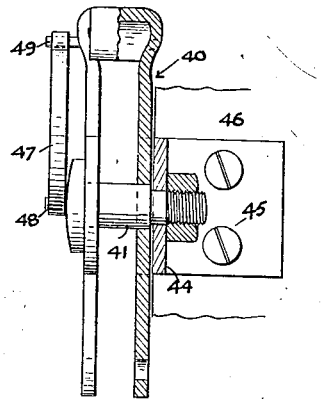
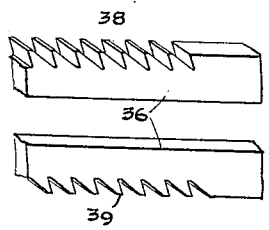
INVENTOR
E. B. MORRIS
BY
ATT'YS Patented Oct. 24, 1922.

1,433,023

UNITED STATES PATENT OFFICE.

EDWARD B. MORRIS, OF OAKLAND, CALIFORNIA, ASSIGNOR OF ONE-HALF TO CHARLES CHADWICK BURNS, OF OAKLAND, CALIFORNIA.

GEAR CONTROL FOR AUTOMOBILES.

Application filed October 15, 1921. Serial No. 507,903.

*To all whom it may concern:*

Be it known that I, EDWARD B. MORRIS, a citizen of the United States, residing at Oakland, in the county of Alameda and State of California, have invented new and useful Improvements in Gear Controls for Automobiles, of which the following is a specification.

My invention relates to an improved device for holding the control pedal of planetary change speed transmission such as employed on Ford automobiles, in certain positions whereby holding of the pedal with the foot is unnecessary.

In automobiles of the above type to operate in "low" or first speed the operator must hold the pedal in a certain position against the action of a stiff spring. In negotiating mountain grades or long hills and at other times when it is necessary to operate in "low" it is an exceedingly tiresome operation to hold the pedal in "low" or first speed position. Accordingly I have provided a device by means of which the pedal may be locked in a quickly releasable manner in "low" position and I therefore obviate the necessity of holding the pedal in "low" position with the foot and accordingly remove one of the chief objections to cars of this type.

Another object of the invention is to provide a device of the character described which may be easily attached to an automobile and associated with the control mechanism for the gears without necessitating any change in the construction of the automobile, and which is relatively simple as to construction, inexpensive and reliable in operation.

Another object of the invention is to provide a pedal holding gear controlling device of the character described in which a double toothed rack bar and double pawl are provided whereby when one set of the teeth and one pawl tooth becomes worn the other teeth may be employed by a simple reversal of the arrangement of such parts, thus rendering the device exceptionally durable and capable of double service.

Another object is to provide a device of the character described which will automatically release its hold on the pedal when the latter is pushed inwardly slightly, while held in either "neutral" or "low" positions, the locking or holding operation being effected by a pedal operated means which is actuated by one foot while the other foot is employed to push the pedal to the position in which it may be locked.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 5 is a fragmentary vertical sectional view of an automobile showing a modified form of the invention associated therewith.

Fig. 6 is an enlarged side elevation of the double pawl.

Fig. 7 is a side elevation of the pawl and its mounting, the pawl being broken away in part and shown in section.

Fig. 8 is a fragmentary perspective view of the double rack bar.

Figure 1:
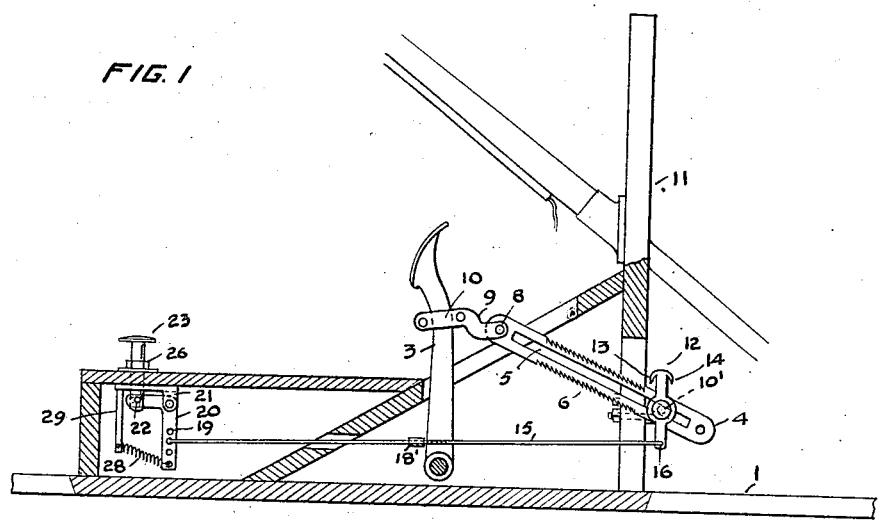
Fig. 1 is a fragmentary vertical sectional view taken through an automobile, showing the gear control pedal and the device of this invention as when ready for use, the pedal being free and in "high" position.

Referring to the embodiment of the invention shown in Figs. 1 to 4 inclusive, of the accompanying drawings, 1 designates the floor boards of an automobile having a planetary transmission (not shown), such as a Ford, operated by the customary pedal 3. This pedal is normally urged into back or "high" position as shown in the drawings, by a stiff spring (not shown), and is moved into and held in "neutral" (midway) and "low" (foremost) position against this spring action.

The device of my invention is for holding the pedal in either "low" or "neutral" position, whereby holding the pedal with the foot is unnecessary. I employ a rack bar 4 having a longitudinal slot 5 and rack teeth 6 on opposite longitudinal edges. The upper end of this bar is pivoted as at 8 to one end of an angular bracket 9 clamped as at 10 on the shank of the pedal 3. The bar 4 extends downward and forward from the pedal being free at its lower end. Pivoted as at 10 to the framework 11 of the automobile body and slidably supporting the rack bar 4 is an upright pawl 12 having teeth 13 and 14 on opposite sides of its upper end. One of these teeth, for example, the one 13 is arranged to cooperate with the upper set of teeth 6 on the rack bar. The pivot member for the pawl extends through the slot in the rack bar, whereupon the latter is slidably supported by the pawl.

As a means for operating the pawl, an adjustable rod 15 is pivoted, as at 16 to the lower end of the pawl below the pivot 10 and extends rearwardly to a point adjacent the front wall of the front seat. (Both not shown.) The rod is in two parts, one being threaded as at 17 and turned in a threaded sleeve 18 integral with a collar 18' which is fixed to the other part or section of the rod. By this arrangement the rod may be adjusted as desired to suit the particular automobile and to regulate the throw of the pawl.

The rear end of the rod is pivoted in one of a series of holes 19 in a bell crank 20. The bell crank is pivoted to a bracket 21 mounted on the under side of the floor boards. The other end of the crank is provided with a pin and slot connection as at 22, with the lower end of the pedal 23. The pedal is slidable vertically in an externally threaded bushing or sleeve 24 mounted in an opening 25 in the floor board. A nut member 26 is threaded on the upper end of the sleeve and rests upon the top of the floor board. The lower end of the sleeve is turned in a threaded opening 27 in the bracket 21. A retractile spring 28 is attached at its ends to the lower end of the bell crank and lower end of an arm 29 depending from the bracket 21. This spring holds the pedal 23 in up position and likewise holds the pawl in inoperative position. It also serves to release the pawl and return the same and the pedal 23 to normal position, as will be hereinafter described.

Operation.

Figure 2:
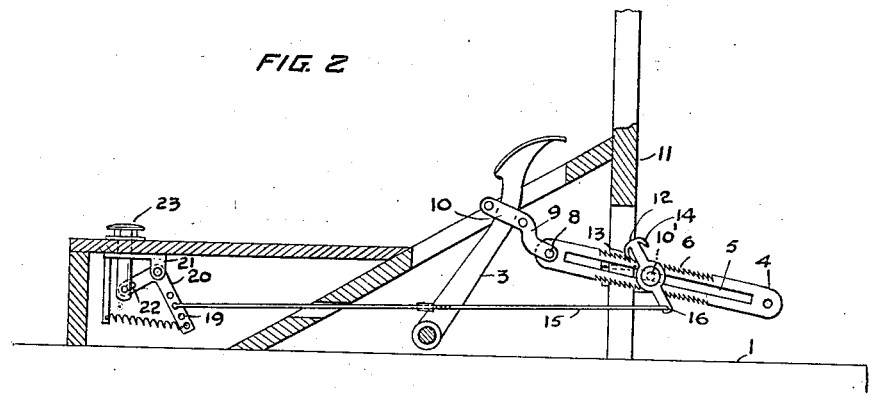
Fig. 2 is a view similar to Fig. 1 but showing the pedal held by the device of this invention, in "low" position.
Figure 3:
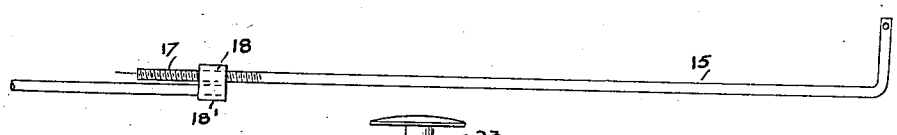
Fig. 3 is a fragmentary top plan view of the operating rod showing the special adjusting means therefor.
Figure 4:
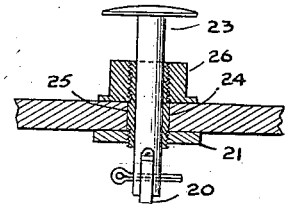
Fig. 4 is an enlarged fragmentary vertical sectional view showing in detail the manner of mounting and supporting the pedal for operating the holding device.

When it is desired to lock the pedal 3 in "neutral" or "low" position, the pedal 23 is depressed while the operator holds the pedal 3 in the desired position. When the pedal 23 is depressed the bell crank 20 is rocked and pushes outward on the rod 15, whereupon the pawl is rocked so as to bring the tooth 13 into engagement with one of the upper teeth 6. This, it will be seen, holds the rack bar in fixed position and the pedal is held, for example, in the "low" position, as shown in Fig. 2. When it is desired to release the pedal 3, by pushing the pedal slightly downward, the tooth 13 is released and the pawl through action of the spring 28 returns to normal position. The rod and pawl 23 will likewise be restored to normal position.

When the upper teeth 6 become worn and in case the tooth 13 wears, the rack bar may be reversed to bring the lower teeth uppermost and the pawl also reversed to bring the tooth 14 in position for use. Thus, the rack bar and pawl will provide for double service and the life of the device increased two-fold.

Referring to Figures 5, 6, 7 and 8, I have shown a modified form of the invention. In these figures 31 designates the floor boards in an automobile, 32 the steering wheel, 33 the column therefor and 34 the planetary transmission pedal. Attached to the pedal 34 is an angular bracket or clamp 35 to which one end of a longitudinally slotted rack bar 36 is pivoted, as at 37, in the same manner as in the preferred form of the invention. The rack bar is provided on its upper and lower edges with teeth 38 and 39 extending in opposite directions. A pawl 40 is pivoted upon a pin 41 intermediate of its ends and has pawl teeth 42 and 43. The pivot pin 41 extends through a bracket 44 held by fastenings 45 to a part of the frame piece 46 of the body of the automobile. The pin 41 extends through the slot in the rack bar and thus slidably supports the rack bar with the teeth 38 in position to be engaged by the teeth 42 of the pawl. To provide for holding the pawl in upright or inoperative position, a leaf spring 47 is secured as at 48, at one end to the pin 41 and at its other end engages one side of a pin 49 carried adjacent the upper end of the pawl. As means for operating the pawl, a rod 50 is rotatably mounted upon the steering column 33 and at its upper end has a handle portion 51 working over a notched quadrant 52. The other end of the rod is bent so as to provide a crank arm 53 at the outer end of which arm a flexible element such as a chain 54, is connected. The other end of the flexible element is pivoted as at 55 to the lower end of the pawl 40. Thus, it will be seen, that when the handle 51 is moved the rod 50 is rotated and a pull is communicated through the lower end of the pawl to the chain 54. This will move the pawl so that the tooth 32 will cooperate with the upper tooth 38 and hold the rack bar and pedal in desired position. To release the pedal the operator pushes downwardly thereon slightly, whereupon the pawl 32 will be released and by action of the spring 47, the pawl will be moved out of position engaging the rack bar.

It will thus be seen that this form of the invention is the same as that previously described except as to the means of operating the device so as to hold the pedal in either "low" or "neutral" position. Preferably the pawl is bifurcated, the opposite sides of the slotted bar, bearing upon the sides of the rack bar so as to steady the same.

I claim:

1. In a device of the character described, the combination of the gear control pedal of an automobile, which pedal requires manually holding thereof in certain of its positions, of a rack bar attached to and movable with the pedal, a pawl pivoted to a fixed part of the automobile and slidably supporting the rack bar, spring means normally holding the said pawl out of engagement with the rack bar and means manually operable from the driver's seat for moving the said pawl into position to engage and hold the rack bar against movement.

2. In a device of the character described, the combination of the gear control pedal of an automobile, which pedal requires manually holding thereof in certain of its positions, of a rack attached to and movable with the pedal, a pawl pivoted to a fixed part of the automobile and slidably supporting the rack bar, spring means normally holding the said pawl out of engagement with the rack bar and means manually operable from the driver's seat for moving the said pawl into position to engage and hold the rack bar against movement, said rack bar having a longitudinal slot therein through which the pivot member of the pawl extends.

3. In a device of the character described, the combination of the gear control pedal of an automobile, which pedal requires manually holding thereof in certain of its positions, of a rack attached to and movable with the pedal, a pawl pivoted to a fixed part of the automobile and slidably supporting the rack bar, spring means normally holding the said pawl out of engagement with the rack bar and means manually operable from the driver's seat for moving the said pawl into position to engage and hold the rack bar against movement, said rack bar having teeth upon opposite longitudinal edges thereof and an extra tooth upon said pawl whereby upon wear of the parts, the rack bar and pawl may be reversed to provide for use of the last named tooth thereof.

4. In a device of the character described in combination with a change speed control pedal of an automobile said pedal adapted to be held by the foot in certain of its positions, of a rack bar attached to and movable with said pedal, a pawl, a member pivotally supporting said pawl on a fixed part of an automobile, said rack bar having a slot therein through which said member extends, means for moving the said pawl into position to hold the rack bar against movement and means which when the pedal is depressed, will automatically move said pawl out of holding position.

5. In a device of the character described the combination with a change speed control pedal of an automobile said pedal adapted to be held by the foot in certain of its positions, of a rack bar attached to and movable with said pedal, a pawl, a member pivotally supporting said pawl on a fixed part of an automobile, said rack bar having a slot therein through which said member extends, a second pedal, a rocker member connected with said pedal, a rod connected with said rocker member and pawl and a spring normally holding the said pedal, rocker arm, rod and pawl, in inoperative position.

6. In a device of the character described the combination with a change speed control pedal of an automobile said pedal adapted to be held by the foot in certain of its positions, of a rack bar attached to and movable with said pedal, a pawl, a member pivotally supporting said pawl on a fixed part of an automobile, said rack bar having a slot therein through which said member extends, a second pedal, a rocker member connected with said pedal, a rod connected with said rocker member and pawl and a spring normally holding the said pedal, a rocker arm, rod and pawl, in inoperative position said rod being longitudinally adjustable.

EDWARD B. MORRIS.